United States Patent
Frenkel et al.

(10) Patent No.: US 11,250,064 B2
(45) Date of Patent: Feb. 15, 2022

(54) SYSTEM AND METHOD FOR GENERATING FILTERS FOR K-MISMATCH SEARCH

(71) Applicant: OFEK—ESHKOLOT RESEARCH AND DEVELOPMENT LTD., Karmiel (IL)

(72) Inventors: Zakharia Frenkel, Haifa (IL); Zeev Volkovich, Karmiel (IL)

(73) Assignee: OFEK—ESHKOLOT RESEARCH AND DEVELOPMENT LTD., Karmiel (IL)

(*) Notice: Subject to any disclaimer, the term of this patent is extended or adjusted under 35 U.S.C. 154(b) by 12 days.

(21) Appl. No.: 16/495,397

(22) PCT Filed: Mar. 19, 2018

(86) PCT No.: PCT/IL2018/050311
§ 371 (c)(1),
(2) Date: Sep. 19, 2019

(87) PCT Pub. No.: WO2018/173042
PCT Pub. Date: Sep. 27, 2018

(65) Prior Publication Data
US 2020/0019571 A1    Jan. 16, 2020

Related U.S. Application Data

(60) Provisional application No. 62/473,400, filed on Mar. 19, 2017.

(51) Int. Cl.
*G06F 7/00* (2006.01)
*G06F 16/903* (2019.01)
(Continued)

(52) U.S. Cl.
CPC ...... *G06F 16/90344* (2019.01); *G06F 16/906* (2019.01); *G06F 16/9032* (2019.01);
(Continued)

(58) Field of Classification Search
CPC .............. G06F 16/2474; G06F 16/903; G06F 16/9032; G06F 16/9035; G06F 16/906;
(Continued)

(56) References Cited

U.S. PATENT DOCUMENTS 5,168,147 A  * 12/1992 Bloomberg .......... G06K 7/0166
235/456
7,444,326 B1    10/2008 Jagadish
(Continued)

FOREIGN PATENT DOCUMENTS

EP         1435581        7/2004
WO     WO 03/081507     10/2003
(Continued)

OTHER PUBLICATIONS

Rasmussen et al. "Efficient q-gram filters for finding all matches over a given length"; Journal of Computational Biology, 2006, vol. 13.2, 296-308. Retrieved from the Internet: <http://citeseerx.ist.psu.edu/viewdoc/download?doi=10.1.1.465.2084&rep=rep1&type=pdf> Nov. 2, 2006.
(Continued)

*Primary Examiner* — Mohammed R Uddin
(74) *Attorney, Agent, or Firm* — Pearl Cohen Zedek Latzer Baratz LLP

(57) ABSTRACT

A computer system for executing k-mismatch searches, comprising at least one processor, configured to: receive a size of a search term; receive a similarity threshold: and generate a set of filters by: forming the set of filters based on a set of combinations of positions of matches, and gaps for the—size of the search term according to the similarity threshold, wherein each one—of the combinations contains at least one filter from the set of filters.

18 Claims, 9 Drawing Sheets

(51) Int. Cl.
*G06F 16/9032* (2019.01)
*G06K 9/62* (2022.01)
*G06F 16/906* (2019.01)
*G06F 16/9035* (2019.01)

(52) U.S. Cl.
CPC ....... *G06F 16/9035* (2019.01); *G06K 9/6203* (2013.01); *G06K 9/6218* (2013.01)

(58) Field of Classification Search
CPC ............ G06F 16/90344; G06K 9/6218; G06K 9/60203
See application file for complete search history.

(56) References Cited

U.S. PATENT DOCUMENTS

| | | | |
|---|---|---|---|
| 7,584,173 B2 | 9/2009 | Bax et al. | |
| 7,756,847 B2 | 7/2010 | Egner et al. | |
| 8,090,678 B1* | 1/2012 | Glickman | G06F 16/35 707/602 |
| 9,665,641 B1* | 5/2017 | Zhang | G06F 16/285 |
| 10,331,677 B1* | 6/2019 | Horowitz | G06F 16/24575 |
| 10,545,960 B1* | 1/2020 | Zhu | G06F 16/2456 |
| 2002/0099702 A1* | 7/2002 | Oddo | G06F 16/35 |
| 2002/0102567 A1* | 8/2002 | Fodor | C07K 17/06 435/6.14 |
| 2004/0072204 A1* | 4/2004 | Shibuya | G16B 25/00 435/6.14 |
| 2005/0187916 A1* | 8/2005 | Levin | G06F 7/02 |
| 2006/0179052 A1 | 8/2006 | Korst et al. | |
| 2007/0038381 A1* | 2/2007 | Melchior | G16B 30/00 702/19 |
| 2007/0067108 A1* | 3/2007 | Buhler | G16B 50/00 702/19 |
| 2008/0120292 A1* | 5/2008 | Sundaresan | G06F 16/951 |
| 2008/0256070 A1* | 10/2008 | Inglis | G16B 50/00 |
| 2009/0171759 A1* | 7/2009 | McGeehan | G06Q 40/00 705/35 |
| 2009/0171955 A1* | 7/2009 | Merz | G06F 16/24558 |
| 2010/0125594 A1 | 5/2010 | Behm et al. | |
| 2012/0208706 A1* | 8/2012 | Downing | G16B 20/00 506/2 |
| 2012/0226492 A1* | 9/2012 | Tsuboi | G06F 16/3344 704/9 |
| 2012/0271827 A1* | 10/2012 | Merz | G06F 16/90344 707/737 |
| 2013/0124474 A1* | 5/2013 | Anderson | G06F 16/3338 707/634 |
| 2014/0132452 A1* | 5/2014 | DeAngelis | G01S 5/0018 342/451 |
| 2014/0201126 A1* | 7/2014 | Zadeh | A61B 5/165 706/52 |
| 2015/0178445 A1* | 6/2015 | Cibulskis | G16B 20/00 702/19 |
| 2015/0186471 A1* | 7/2015 | Yammahi | G06F 16/2468 707/780 |
| 2016/0246851 A1 | 8/2016 | Abe | |
| 2017/0069059 A1* | 3/2017 | Urfalioglu | G06T 5/002 |
| 2017/0235848 A1* | 8/2017 | Van Dusen | G06F 16/904 705/12 |
| 2018/0247016 A1* | 8/2018 | Semenyuk | G16B 30/10 |
| 2018/0363031 A1* | 12/2018 | Becares | G16B 40/00 |

FOREIGN PATENT DOCUMENTS

| | | |
|---|---|---|
| WO | WO 2003/081507 | 10/2003 |
| WO | WO2017081691 A1 | 5/2017 |

OTHER PUBLICATIONS

International Search Report for PCT Application No. PCT/IL2018/050311, dated Jun. 19, 2018.
Landau et al. "Efficient string matching in the presence of errors", Proc. 26th IEEE FOCS, pp. 126-136, 1985.
M.J. Fischer and M.S. Paterson "String matching and other products," Proceedings of the 7th SIAM-AMS Complexity of Computation, R. Karp, editor, pp. 113-125, 1974.
Abrahamson and Kosaraju "Generalized string matching", SIAM journal on Computing, 16(6):1039-1051, 1987.
Amir, Lewenstein and Porat "Faster algorithms for string matching with k mismatches", Journal of Algorithms, vol. 50, Issue 2, pp. 257-275, Feb. 2004.
Califano A., Rigoutsos I., FLASH: A fast look-up algorithm for string homology, in: Proc. 1st International Conference on Intelligent Systems for Molecular Biology (ISMB), pp. 56-64 (1993).
Pevzner, P. A., Waterman, M. S., Multiple Filtration and Approximate Pattern Matching, Algorithmica, 13(1/2), 135-154 (1995).
Lehtinen, O., Sutinen, E., Tarhio, J., Experiments on Block Indexing, Proceedings of the 3rd South American Workshop on String Processing (WSP'96), Carleton University Press (1996).
Ma B., Tromp, J., Li, M.: PatternHunter: Faster and More Sensitive Homology Search, Bioinformatics, 18, 440-445 (2002).
Buhler, J., Keich, U., Sun, Y.: Designing Seeds for Similarity Search in Genomic DNA, Proceedings of the 7th Annual International Conference on Computational Molecular Biology (RECOMB-03) (Apr. 2003).
Farach-Colton M., Landau G., Sahinalp S., Tsur D., Optimal spaced seeds for faster approximate string matching, J. Comput. System Sci. 73 (7) 1035-1044 (2007).
Francois Nicolas, Eric Rivals, Hardness of optimal spaced seed design, J. Comput. System Sci. 74 (5) 831-849 (2008).
Egidi L., Manzini G.: "Better spaced seeds using quadratic residues", Journal of Computer and System Sciences 79(7), pp. 1144-1155 (2013).
Stefan Burkhardt and Juha Kärkkäinen "Better Filtering with Gapped q-Grams" Annual Symposium on Combinatorial Pattern Matching CPM 2001: Combinatorial Pattern Matching pp. 73-85, Jun. 13, 2001.
Sebastian Horwege, Sebastian Lindner, Marcus Boden, Klas Hatje, Martin Kollmar, Chris-André Leimeister, Burkhard Morgenstern "Spaced words and kmacs: fast alignment-free sequence comparison based on inexact word matches" Nucleic Acids Res Jul. 2014;42(Web Server issue):W7-11, May 14, 2014.
Heng Li, Nils Homer "A survey of sequence alignment algorithms for next-generation sequencing" Brief Bioinform11(5):473-83.May 11, 2010.
European Search Report for Application No. 18770601.5, dated Jan. 12, 2021.

* cited by examiner

FIG. 4

| Position | Set |
|---|---|
| 1 | XXX, XX-X |
| 2 | XXX, XX-X |
| .. | ... |
| 12 | XXX, XX-X |
| 13 | XXX, XX-X |
| 14 | XX-X |
| 15 | XX-X |
| 16 | XX-X |
| 17 | XX-X |
| 18 | - |

Fig. 7A

| Position | Set |
|---|---|
| 1 | XXXX, XXX-X, XX-XX, XXX--X, XX-X-X |
| 2 | XXXX, XXX-X, XX-XX, XXX--X, XX-X-X |
| .. | ... |
| 11 | XXXX, XXX-X, XX-XX, XXX--X, XX-X-X |
| 12 | XXXX, XX-XX, XXX--X, XX-X-X |
| 13 | XXXX, XX-XX, XXX--X, XX-X-X |
| 14 | XXXX, XXX--X, XX-X-X |
| 15 | XXXX, XXX--X, XX-X-X |
| 16 | XXXX |
| 17 | XXXX |
| 18 | - |

Fig. 7B

| M | $n_c$ (in Fig. 4) | $n_c$ (position-associated) |
|---|---|---|
| 3 | 35 | 30 |
| 4 | 79 | 71 |
| 5 | 356 | 217 |
| 6 | 1133 | 536 |
| 7 | 2474 | 1562 |

Fig. 7C

SYSTEM AND METHOD FOR GENERATING FILTERS FOR K-MISMATCH SEARCH

CROSS-REFERENCE TO RELATED APPLICATIONS

This application is a National Phase Application of PCT International Application No. PCT/IL2018/050311, International Filing Date Mar. 19, 2018, entitled: "SYSTEM AND METHOD FOR GENERATING FILTERS FOR K-MISMATCH SEARCH", published on Sep. 27, 2018, under publication No. WO 2018/173042, which claims the benefit of U.S. provisional patent application No. 62/473,400, filed on Mar. 19, 2017, which is hereby incorporated by reference in its entirety.

FIELD OF THE DISCLOSED TECHNIQUE

The present invention relates to approximate string matching (k-mismatch) in general, and to generating sets of filters to optimize available computer resources.

BACKGROUND OF THE DISCLOSED TECHNIQUE

Provisional application 62473400, titled "Systems and Methods for Generating a Set of Filters for K-Mismatch Searching", filed Mar. 19, 2017, is herein incorporated by reference in its entirety.

Searching strings over a large-scale database is a time-consuming task. A "naïve algorithm" of a direct search may take days, weeks, or more. Biological databases, such as genome databases or protein databases, collect a large number of genome sequences or proteins, and annotate and analyze them. Other large-scale databases store pictures, audio recordings, video, 3D-structures, and the like.

Detecting similarity in nucleotide and amino acid sequences helps to annotate a sequence of interest. For example, if the sequence is a gene, similar sequences may reveal a similarity in function, in regulation, in the interaction with other molecules, in the three-dimensional structure of the protein product, or in a common evolutionary origin.

A technique to find occurrence of a pattern string in a given text that matches approximately is known as the "k-mismatch problem". The technique is also known as "approximate pattern matching", "approximate string matching", or "fuzzy string searching". There are several algorithms known in the art which solve the k-mismatch problem. These algorithms perform a two stage process in which a search is conducted after pre-processing of one or more patterns.

Landau and Vishkin disclose a method to solve the K-mismatch problem, also called Kangaroo method, with time complexity of $O(n+m)$ for the pre-processing phase and $O(nk)$ for searching a pattern in the text. G. M. Landau, U. Vishkin, "Efficient string matching in the presence of errors", Proc. 26th IEEE FOCS, pp. 126-136, 1985.

Fischer and Paterson disclose an algorithm for the k-mismatch problem with a time complexity of $O(\min|\Sigma|, m)n \log m)$ in "String matching and other products," Proceedings of the 7th SIAM-AMS Complexity of Computation, R. Karp, editor, pp. 113-125, 1974.

Abrahamson and Kosaraju disclose a method for the K-mismatch problem that uses a runtime of $O(n\sqrt{m \log m})$ in "Generalized string matching", SIAM journal on Computing, 16(6):1039-1051, 1987.

Amir, Lewenstein and Porat disclose another algorithm with runtime of $O(n\sqrt{k \log k})$ in "Faster algorithms for string matching with k mismatches", Journal of Algorithms, Volume 50, Issue 2, pp 257-275, February 2004. Both Landau and Vishkin's and Amir, Lewenstein and Porat's methods are linear, for small k.

A filtering approach may speed up the runtime of the approximate string matching process. Filtering-type algorithms discard large parts of the text, aiming to retain the significant parts which contain potential matches. One common filtering approach is based on q-grams. These are substrings of length q. The q-grams of a sequence are all its overlapping substrings of length q. Most of the studies in this field concentrate in non-gapped (i.e., usual) q-gram filters.

Applying filtering approach may be optimally carried out by taking into consideration a necessary, but not sufficient condition for the word similarity at the selected threshold. For example, being a mammal is a necessary condition for being identified as a human but it is not a sufficient condition.

Applying a filtering approach offers improvements over the naïve algorithm. The following two examples are improvements over the naïve algorithm for the task of a search for all words in a given text which are similar to a given word W of 20 letters with one mismatch only (i.e. k=1).

In the first example, a necessary (but not sufficient) similarity condition is imposed as follows: When dividing the word W into two parts: W1 (positions 1-10) and W2 (positions 11-20), a mismatch may be either in W1 (with W2 matched) or in W2 (with W1 matched). A necessary condition for similarity in this case is an exact match with either W1 or with W2. For a search with one-mismatch threshold, one can find words which match exactly with W1 or match exactly with W2 in the text, Then for each exact match to W1, the ten subsequent characters to the exact match are compared with W2. Similarly, for exact match with W2, the ten previous characters are compared with W1 (permitting one mismatch). The exact search of W1 and W2 can be done at time complexity of $O(1)$ by pre-processing the text. This maps all the ten character words, requiring memory of size complexity $O(n)$, with n being the size of the text. The probability of occurrence of W1 and W2 in the text is $(1/d)^{10}$, where d is the size of the alphabet. The time of the search is $(n/d)^{10} \times p$, where p is the expected amount of random comparisons having two mismatches.

The second example has lower runtime, but it requires much larger size of memory, Random Access Memory ("RAM"), for the pre-processing stage. After mapping of all 19-letter words with one "wildcard" in all possible positions. Tithe size of this map is about $19 \times n$, and the speed of finding a solution by extracting from W of all 19-letter words with one wildcard is $O(1)$. A disadvantage of such approach is that it is inapplicable for lower thresholds of similarity. For example, for threshold of 8 mismatches and 20-letter words, the number of possible words containing this many wildcards is very high (20|8). This demands significant memory resources to store the pre-processing text (more than $10^5 \times n$). This is not feasible for larger value of n.

U.S. Pat. No. 7,756,847 discloses an iterative approach for searching for a number of output strings, each having a partial or an exact match with a query string in a database comprised of many long strings or a long string.

U.S. Pat. No. 7,444,326 discloses approximate substring indexing by decomposing each string in a database into overlapping "positional q-grams", sequences of a predetermined length q, and containing information regarding the "position" of each q-gram within the string (i.e., 1st q-gram, 4th q-gram, etc.).

U.S. Pat. No. 7,584,173 discloses a process which determines for a search string which, if any, of the strings in a text list, has an edit distance from the search string that is less than a threshold. The process uses dynamic programming on a grid with search string characters corresponding to rows and text characters corresponding to columns.

A generalization of the q-gram filter uses gapped q-grams (also known as "spaced q-grams"), subsets of characters of fixed noncontiguous shapes. The following reference describes how this method is applied.

Randomly selected shapes are disclosed in Califano A., Rigoutsos I., FLASH: A fast look-up algorithm for string homology, in: Proc. 1st International Conference on Intelligent Systems for Molecular Biology (ISMB), pp. 56-64 (1993). Whereas the use of regular shapes are disclosed in Pevzner, P. A., Waterman, M. S., Multiple Filtration and Approximate Pattern Matching, Algorithmica, 13(1/2), 135-154 (1995); and in Lehtinen, O., Sutinen, E., Tarhio, J., Experiments on Block Indexing, Proceedings of the 3rd South American Workshop on String Processing (WSP'96), Carleton University Press (1996).

Advantages of gapped q-grams on the non-gapped are considered and their application to lossy filtration are disclosed in: Ma, B., Tromp, J., Li, M.: PatternHunter: Faster and More Sensitive Homology Search, Bioinformatics, 18, 440-445 (2002); and Buhler, J., Keich, U., Sun, Y.: Designing Seeds for Similarity Search in Genomic DNA, Proceedings of the 7th Annual International Conference on Computational Molecular Biology (RECOMB-03) (April 2003).

Some approaches for gram development are proposed for the case of a small number of errors in: Farach-Colton M., Landau G., Sahinalp S., Tsur D., Optimal spaced seeds for faster approximate string matching, J. Comput. System Sci. 73 (7) 1035-1044 (2007); Francois Nicolas, Eric Rivals, Hardness of optimal spaced seed design, J. Comput. System Sci. 74 (5) 831-849 (2008); and Egidi L., Manzini G.: "Better spaced seeds using quadratic residues", Journal of Computer and System Sciences 79(7), pp. 1144-1155 (2013).

SUMMARY OF THE DISCLOSED TECHNIQUE

It is an object of the disclosed technique to provide a novel method for generating an optimal set of filters for a given task of search, based on combinatorial properties of shapes, which takes into account the available amount of computer resources.

In accordance with the disclosed technique, there is thus provided a computer system for executing k-mismatch searches, comprising at least one processor, configured to: receive a size of a search term; receive a similarity threshold; and generate a set of filters by: forming the set of filters based on a set of combinations of positions of matches and gaps for the size of the search term according to the similarity threshold, wherein each one of the combinations contains at least one filter from the set of filters.

In some embodiments, the processor is further configured to create a minimal set of filters by: determining, for each filter of the set of filters, that the filter is a retainable filter when there exists at least one combination of the set of combinations which contains only the filter from the set of filters, and deleting the filter from the set of filters when the filter is not a retainable filter.

In some embodiments, each combination of the set of combinations includes a match at the first position of the respective combination.

In some embodiments, each combination of the set of combinations includes a match at the last position of the respective combination.

In some embodiments, the processor is configured to form the set of filters by: initializing the set of filters; for each selected combination of the set of combinations: searching for an occurrence of a filter of the set of filters in the selected combination, deriving a new filter from the selected combination when the occurrence of a filter of the set of filters is not found in the selected combination, and adding the new filter to the set of filters.

In some embodiments, the new filter is a segment of the selected combination.

In some embodiments, any of the new filter and a number of matches of the new filter is determined with a randomization process.

In some embodiments, the number of matches is a predetermined quantity.

In some embodiments, the processor is configured to derive multiple new filters from the selected combination and assign a score to each of the multiple new filters, and add the new filter to the set of filters when the score of the new filter is higher than the score of any other new filter of the multiple new filters.

In some embodiments, the processor is further configured to assign the score to each filter of the set of filters in accordance with a parameter selected from the group consisting of: respective of applying the filter, an expected number of comparisons between the search term and a text; a frequency of occurrence of the filter in the set of combinations; a number of matches in the filter; and a span of the filter.

In some embodiments, the processor is further configured to: create a second set of filters by: select filters from the set of filters, replace each the selected filters with at least one different filter, the selecting and replacing performed according to a sequence sorted from the highest score of the scores of the selected filters to the lowest score of the scores of the selected filter, wherein each one of the combinations contains at least one filter from the second set of filters, and select the second set of filters over the sets of filters in accordance with a fitness score.

In some embodiments, the fitness score is calculated using a parameter selected from the group consisting of: an expected computation speed of search determined as a function of a sum of an expected number of comparisons for all the filters in the set of filters; an amount of memory required to conduct a search respective of the set of filters.

In some embodiments, the processor is further configured to generate multiple ones of the set of filters, wherein: each position in the search term corresponds to at least one of the multiple ones of the set of filters, wherein each one of the combinations contains, at a position in the respective one combination, at least one filter from at least one of the multiple ones of the set of filters, the position of the search term corresponding to the position in the respective one combination. i.e. the processor creates multiple sets of filters. Each position in the search term corresponds to at least one of the sets of filters. Each combination contains at least one filter from one of the multiple sets of filters. The position in the combination where the filter is found corresponds to the position in the search term that corresponds to the set of filters containing that filter, i.e. the filter in the combination.

In some embodiments, the processor is configured to form each of the multiple ones of the set of filters by: designating the set of combinations as a current set of combination, and designating the set of filter based on the current set of combinations as a current set of filters, obtaining a sequence of positions in the search term, for each the position, in accordance with the sequence, generate a set of filters in association with the position, update a combination from the current set of combinations when the combination contains a filter from the generated set of filters associated with the position and when the filter is present in the combination at that position, delete a filter from the current set of filters when the filter is not retainable with respect to the current set of combinations, wherein the filter is retainable with respect to the current set of combinations when there exists at least one combination of the current set of combinations which contains only the filter.

In some embodiments, the processor is configured to form the set of filters associated with a position by: obtaining the set of combinations, the current set of filters and the position; for each filter of the current set of filters: add a filter to the set of filters associated with the position when the filter is found in at least one of the combinations from the set of combinations at the position, and delete such combinations from the set of combinations.

In some embodiments, the processor is further configured to: receive a lossy threshold, create a subset of the combinations in accordance with the lossy threshold respective of the search term and the similarity threshold, wherein generating the set of filters comprises generating the filters respective of the subset of the combinations.

In some embodiments, the size of the search term corresponds to multiple possible sizes for the search term, and wherein the similarity threshold corresponds to multiple similarity thresholds, each similarity threshold corresponding to a size from the multiple possible sizes for the search term.

In some embodiments, the at least one hardware processor is further configured to form a plurality of sets of sets of filters, where each one of the plurality of sets of sets of filters corresponds to a different sequence of a plurality of sequences of the positions in the search term.

In some embodiments, the at least one hardware processor is further configured to select a set of sets of filters from the plurality of sets of sets of filters according to an expected number of comparisons performed when the selected set of sets of filters is applied for executing the k-mismatch search, where the expected number of comparisons is a function of a given text and a given word for search.

In some embodiments, the at least one hardware processor is further configured to apply the executing of said k-mismatch search for clustering a plurality of words of a text.

In some embodiments, the at least one hardware processor is further configured to apply the clustering to accelerate a text indexing step of the k-mismatch search.

BRIEF DESCRIPTION OF THE DRAWINGS

The disclosed technique will be understood and appreciated more fully from the following detailed description taken in conjunction with the drawings in which:

FIG. 4 is an illustration of examples of minimal sets of filters obtained by embodiments of the present invention, their advantage over naïve algorithm;

FIGS. 7A-7C illustrate the generation of a position-associated set of filters.

DETAILED DESCRIPTION

Figure 1:
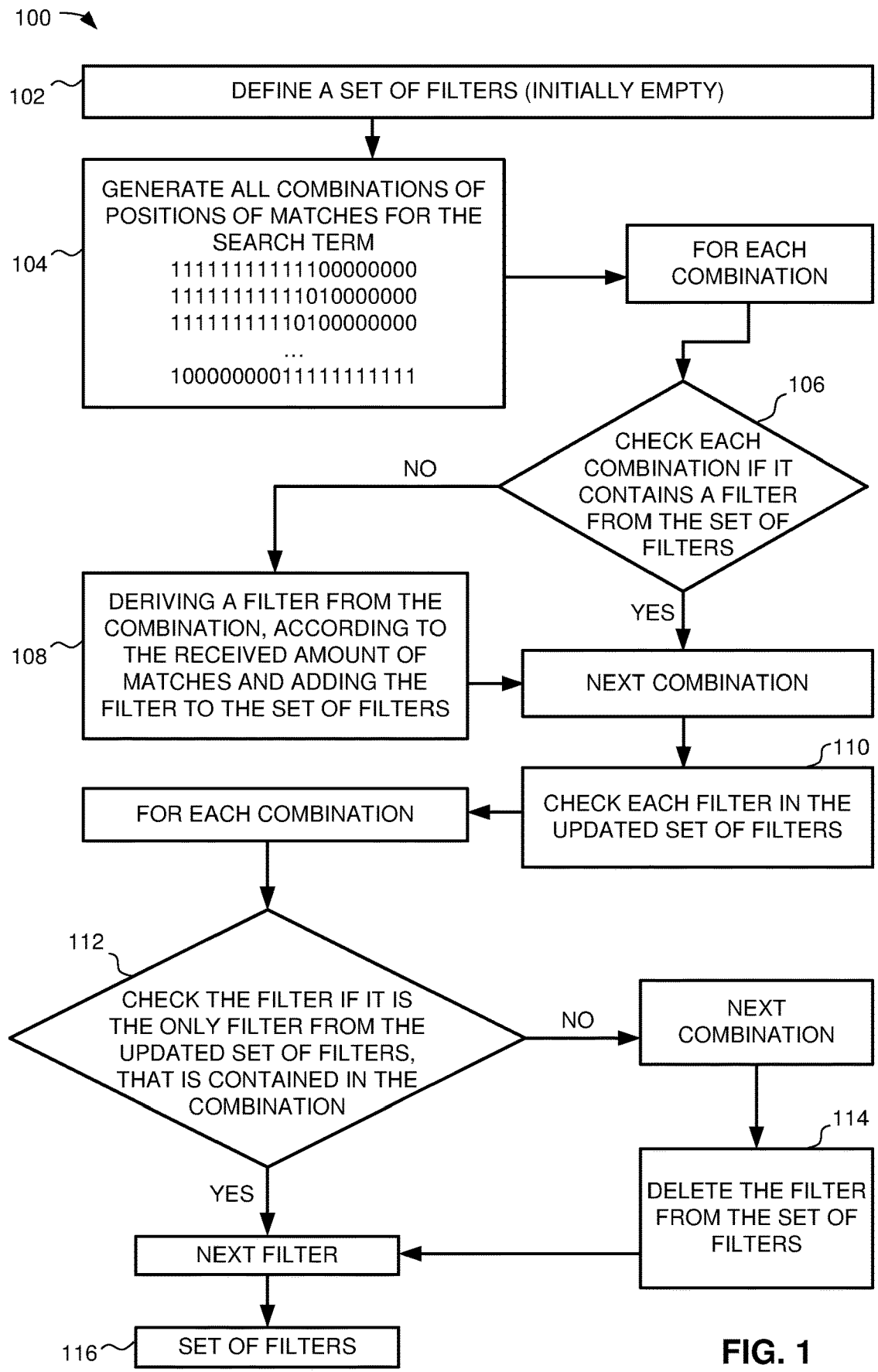
FIG. 1 is a flow chart explaining the steps of a method for generating a set of filters.

The present invention provides a method for generating an optimal set of filters for a given task of search, taking into account the available computer memory i.e. Random Access Memory ("RAM") available for the task.

The present invention may be applied for full or partial calculation of a Protein Connectivity Network ("PCN"). A PCN is a graph that can be used in order to solve different problems of computational biology, mainly to assist in the prediction of protein structure and functionality. The PCN consists of nodes that are small fragments of protein sequences, and an edge between nodes reflects high similarity between fragments.

Full or partial calculation of the PCN for a large enough protein database is a crucial process, requiring large amount of computational resources. Therefore, improving the process by an effective algorithm is very important. The finding of all edges for such graph is an example of the k-mismatch search problem.

The task of "k-mismatch problem" is significant for many systems that support word search over large-scale databases. In addition to bioinformatics (i.e. search of DNA and protein subsequences), the present invention may be applied for document or internet searches, by representing information such as pictures, sound, video, and 3D-structures as linear text, built from a corresponding alphabet.

Embodiments of the present invention may be applied to systems including different types of large-scale database. For example, a database may be distributed over multiple servers, or alternatively the database may be massively partitioned. Since the amount of stored information is growing exponentially, developing an effective algorithm for a quick search on large-scale databases is of increased importance.

The term "text" refers hereinafter to digital text which is an electronic version of written text. The text may be given as a bulk via electronic media or accessed remotely via online streaming over a network.

The term "similarity" refers hereinafter to a match of a search term in the searched text or stream of data with specified threshold of mismatch.

The term "Hamming distance" refers hereinafter to the distance between a string, or alternatively a substring, and a pattern.

Approximate string matching is a technique for finding strings that approximately match a pattern, by searching for all the positions in a text where the distance between the sub-string located at that position and the pattern is smaller or equal to a bound k.

The term "string" refers to herein as any sequence of letters. The sequence of bits may be a portion of another sequence of bits, e.g. the term string also includes any substring of a string.

The term "shape" refers hereinafter to a form of a filter. The shape includes positions of matches and has a size and span. The size is the amount, or number of matches and the span is the length of the shape including the positions of the matches and the gaps between them if any. For example, the shape {0,1,3,6}, ##-#--#. Its size is 4 and its shape is 7. The gaps represent positions in which a match may not occur. The sequence of matches in a shape without the gaps is also called seed and gaps are also called spaces.

The term "gapped q-gram filter" refers hereinafter to filters with a defined shape, having the size of q, i.e. the amount or number of matches is q. Gapped filters are also called spaced seeds.

The term "filter" may refer hereinafter to a gapped q-gram filter.

The term "indexing" refers hereinafter to a search for all similar terms of each term in a given text.

The term "minimal set of filters" refers hereinafter to a set of filters which are a necessary condition for a given threshold of similarity and it may be used for a search term. In other words, there is not any filter which can be deleted from the set.

The term "similarity graph of words" refers hereinafter to a graph where the nodes are multiplicity of words of a selected size from the text (with overlapping), and the edges reflect the similarity between connected words more or equal than a defined threshold of similarity.

The term "combination" refers herein after to a possible combination of positions of matches and gaps meeting the conditions of the similarity threshold for the given size of a search term, and denoted as a sequence of '0's and '1's, where, for a given position of the sequence, a '0' indicates a mismatch and '1' indicates a match at the corresponding position.

In general, the term "exhausted" indicates that an iterative process has run out of input to continue, whether that input is a set of filters or a set of combinations. For example, the term "the set of all combinations is exhausted" refers herein after to a situation where the set of all combinations is either empty or completely marked as reviewed.

The term "segment of a combination" refers hereinafter to a sequence of matches and mismatches starting from some position of the combination. A filter that is taken as a segment from a combination begins from a matched position and continues until a predefined number of matches is found (i.e. at the end of a segment there should be a match). For example, for the combination 10011010100111, the filters having 4 matches are: 1001101, 110101, 10101001, 1010011 and 100111. Optionally, the number of matches might not be defined, or received as a user input. In such cases the number of matches may be selected randomly from a predefined interval.

A large text (e.g. more than 1G), may present some limitations on RAM usage. Embodiments of the present invention may be realized in different computational environments, such as distributed over one or more computers, collectively having considerable memory resources (e.g. 10-100 times larger than the text to be searched), or distributed over a network of computers (nodes), each having substantially limited memory resources (e.g. less or comparable to the size of the text searched.

There disclosed technique offers improvements over memory usage and search time over the prior art under a range of conditions: such as search text content, alphabet, permitted number of mismatches, and word size, to name a few.

An exemplary embodiment of the present invention provides a computer system for generating a set of filters for executing one or more k-mismatch searches over a text. The computer system includes at least one hardware processor. The computer system may be any of: a distributed network of multiple hardware processors; a local network of multiple hardware processors; or a stand-alone computer. The computer system receives the following parameters: a size of a search term, a similarity threshold and a number of matches for a filter. The number of matches in the filter may be defined automatically, such as on the basis of the size of the text being searched, and the amount of available RAM.

The computer system generates the set of filters based on a complete set of the possible combinations for positions of matches and gaps for the size of a search term, and according to the similarity threshold. For example, for a search of length 5, having a similarity threshold of 4 matches (e.g. at least four out of five bits must match and therefore at most 1 bit can mismatch), in addition to a perfect match (e.g. zero mismatches) there are 5 possible combinations since the mismatch can occur at any of positions 1 through 5 of the search term. Thus generated, the set of filters may be subsequently reduced to increase the memory usage and computational efficiency.

More formally, the computer system may repeat the following steps to reduce the size of the set of filters to achieve the minimal set i.e. to yield a minimal set of filters: a) selecting a filter from the set of filters and b) determining the filter as retainable filter if the filter is the only filter from the set of filters that is contained within at least one of the combinations in the set of combinations. Otherwise, when the filter is not determined a retainable filter, the computer system removes the filter from the set of filters. Although the set of filters has been reduced to a minimal set, and may still be applied for a search that is not lossy i.e. such that every term is found in the text.

The memory requirements for implementing the techniques disclosed herein are determined by the number of filters, among other parameters. The following description relates to techniques for determining a minimum set of filters, i.e. a sufficient number of filters to cover all the possible combinations, but no more. The effectiveness of determining the minimal set of filters is determined by the following parameters:

1) The memory requirements for implementing the mapping step. This is evaluated as a function of the number of filters in the minimal filter set (MCS). The complexity of this parameter may be estimated as $O(n*|MCS|)$, for size of search text n, and number of filters in the minimal set given by $|MCS|$.
2) The speed of search may be determined according to at least two factors: the number of comparisons between the search query and the search text, and the number of "idle" filter comparison. The latter relates to cases where sub-sequences of a filter are not found in the search text. For large search texts and a correspondingly significant number of occurrences of the filters, the factor largely determining the speed of search corresponds to the number of comparisons. Conversely, when the size of the search text is relatively small and the frequency of occurrences of the filters is correspondently low, then the limiting factor determining the speed of search is primarily the number of "idle" checks.

The number of comparisons of the search query with the search text may be calculated as the sum of the comparisons, as estimated for each filter in the MCS, given as follows:

Number of comparisons=$P*L*n$

Where P is the probability of occurrence for the filter, L is the number of positions in the search query where the filter is present, and n is the size of the search text.

The probability of occurrence for the filter, P can be estimated as:

$P = 1/\Sigma$letters in the alphabet$^m$

Where m is the number of matches in the filter.

The number of "idle" checks may be estimated as:

number of idle checks=$(1-P)^n * L * |MCS|$

For L=(size of query)−(span of filter)+1.

Typically, a higher the number of required matches (threshold) corresponds to a larger minimal filter set (MCS). Thus, although selecting filters having very low probabilities of occurrence (e.g. having a relatively high_number of required matches) decreases the number of comparisons, this requires greater memory resources to account for the larger MCS, —and increases the number of "idle" checks. One needs to optimize the selection of the most suitable MCS's for a given problem, accounting for memory availability. The optimal number of matches in the filters (m), which determines the probability of occurrence P and the |MCS| may be determined experimentally, per application. To handle situations of insufficient memory, the map of the full-sized search text may be divided into sections, and the search may be implemented per section, either serially or in parallel. The size of each section, $n_s$, may be selected according to the RAM required to perform the mapping for the MCS for that respective section.

For relatively small search texts, or for cases where the search text can be divided into smaller sections, and searched separately, the following technique may be used:

1) Create multiple MCSs, each of which complies with the given search requirements, such as the size of the search query and similarity threshold (maximal number of mismatches). Arrange the sets according to the number of matches in the filters. The general rule is: the greater the number of matches the fewer the number of comparisons between the search query and the search text, demanding more memory (RAM) to perform the mapping, and resulting in a higher number of "idle" checks.

2) Measure speed of the search for each MCS.

3) Select the MCS that provides search results in the shortest amount of time, i.e. the maximal speed.

The following table illustrates the technique described above for calculation the minimal filter set (MCS) for a query word of size 10 characters. The table illustrates employing the above technique to find all the similar words in the text that contain no more than four mismatches.

First, all the combinations for matches and mismatches are considered, and a minimal set (MCS) of filters is created such that, each combination contains at least one filter from the set. Denoting a match as "1", a mismatch (or don't care) as "0", and:

ABCDEFGHIJ—query
1111110000—combination of matches mismatches
ABCDEFQQQQ—text

Table A below illustrates creating a MCS corresponding to the criterion given above, with the filters indicated in bold. When the filter is selected from the combination, one takes the first filter containing four matches:

TABLE A

| Combination of matches | MCS |
|---|---|
|  | { } |
| 1111110000 | {"1111"} |
| 1111101000 | {"1111"} |
| 1111011000 | {"1111"} |
| 1111011000 | {"1111", "11101"} |
| 111111000 | {"1111", "11101"} |
| 1011111000 | {"1111", "11101"} |
| 1011110100 | {"1111", "11101"} |
| 1011101100 | {"1111", "11101"} |
| 1011011100 | {"1111", "11101", "101101"} |
| 1010111100 | {"1111", "11101", "101101"} |

Beginning with the null set { }, the first filter is derived from the combination as the first occurrence of four matches with the search term, in this case {"1111"}, and added to the MCS set. This filter occurs in the next two combinations, and is therefore not added again. The fourth combination does not contain any filter from the current set of filters (e.g. the current set of filters only contains the filter "1111", which is not found in the fourth combination, "1110111000"). Thus, a new filter is derived to ensure that each combination includes (e.g. is "covered") by at least one filter. For example, the new filter may be derived from the uncovered combination by taking the first segment of that combination having the number of matches corresponding to the threshold, defining the number of matches in the filters. In the example above, this segment corresponds to the sequence "11101", having four 1's, corresponding to the threshold of four matches, and positioned at bits 1 through 5 (1 mismatch at bit 4) of the fourth combination. This segment is added as the second filter to the set of filters. These next four combinations include filters that are already included in the MCS, and are thus "covered". The second last combination provides a third filter: "101101", which is not yet included in the MCS. This filter is added as the third filter. The last combination includes an occurrence of a filter that has already been included in the MCS, i.e. "1111", and is ignored. The result is a MCS with three filters that cover all the combinations considered in the table.

According to another embodiment of the present invention, the complete set of combinations consists of combinations having a match in the first position or, alternatively, in the first and the last position. Such sets are advantageous in that they may be considerably smaller the full set, without losing any of the relevant matches.

Exemplary embodiments of the present invention will be explained below with reference to the drawings.

FIG. 1 is a flowchart of a method for generating a minimal set of filters 100. The generation of minimal set of filters is a pre-process stage which precedes the search of the search term in a given text. The set of filters may be reduced by taking into consideration only the necessary but not sufficient condition, for the word similarity at a predetermined threshold.

The computer system is used to perform the following steps:

An empty set of filters is defined 102. A set of all combinations of matches and gaps for each search term of the at least one search terms is generated 104. Due to size limitations of memory, combination may be generated on the fly and then removed from memory.

After generating a set of all combinations, each combination in the set is examined to see if it contains a filter from the current set of filters 106.

If a filter from the updated set of filters is not found in the combination, a filter is derived from the combination and the newly derived filter is added to the set of filters 108. The newly derived filter may be a segment of the combination or may be randomly derived. If the examined combination contains at least one filter from the set of filters, the next combination is examined. The size of the filter may be based on the number of matches, which may be received as an input. Alternatively, the number of matches may be randomly selected. The segment of the combination may also be referred to as shape.

The size of memory required for the pre-processed text is proportional to the size of the text being searched, multiplied by the size of the set of filters. If the size of the pre-processed text is too large, then a smaller shape size, i.e. smaller number of matches may be considered. The greater the number of matches, the larger the set of filters, which increases the amount of memory required for the pre-processed text stage.

Alternatively, the text may be divided into smaller parts and each part may be processed separately in a parallel computing environment (e.g. two or more computer processors may be used simultaneously).

After all the combinations from the set of all combinations are checked, the set of filters is reduced according to the following steps: Each filter in the set of filters is examined 110, by examining each combination in the set of all combinations 112 to verify that the filter is a singular occurrence in the combination. A singular occurrence means that although a combination may contain multiple occurrences of the same filter, if there is an occurrence of a different filter from the set of filters in all the combinations, the examined filter is not a singular occurrence. If the examined filter is not a singular occurrence, it is deleted from the set of filters 114. Then, the next filter in the updated set of filters is examined until all the current filters in the set of filters have been examined. The resulting set of filters includes only filters that are a singular occurrence in at least one of the combinations. This is the minimal set of filters 116.

Figure 2:
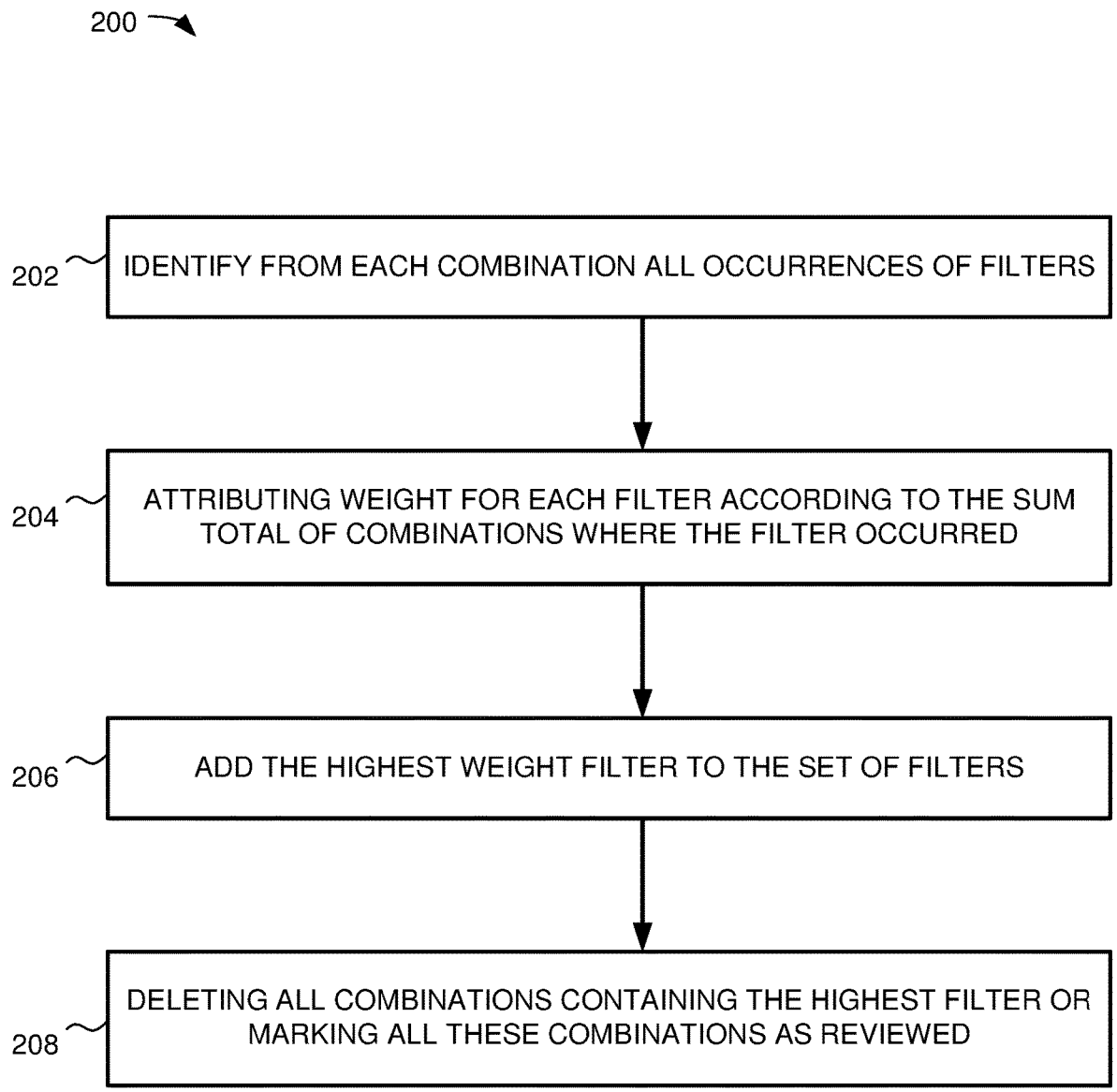
FIG. 2 is a flow chart explaining the steps of an additional method for filling a set of filters.

Embodiments of the present invention provide detailed steps for creating the set of filters, as described above in FIG. 1 in steps 106-108. An alternative method to these steps is detailed in FIG. 2 and described as follows. All occurrences of filters from each combination are identified 202. If the number of all the possible filters is too large, it can be limited by additional conditions, such as a fixed upper bound of matches, a maximal span, the selection of filters may be limited to be a segment from a combination, to name but a few possible limitations. A weight, or score is assigned to each filter. For example the score is determined according to the sum total of combinations where the filter occurred 204. The filter with the highest score is added to the set of filters 206. The combinations containing this filter may be marked as reviewed 208 or removed from the set of combinations that are being examined. Process 200 i.e. steps 202-208 may be repeated for any unmarked combinations that have not been removed, until a good set of filters is found. A "good" set of filters is a set of filters that may be used to conduct a faster search or yield higher quality results as compared to prior art methods. For some search conditions, executing process 200 provides an effective set of filters in a shorter amount of time as compared to prior art methods. To generate a minimal set of filters, steps 202-206 may be repeated for any unmarked (or not removed) combinations until a satisfactory filter set has been built, or the set of the combinations is empty or is completely marked as reviewed.

Figure 3:
FIG. 3 is an illustration of the use of the set of filters.

With reference to FIG. 3, an exemplary illustration of the use of the set of filters is shown. For a search word, W="AARRCCDDEE", and an MCS, for S={XXX, XX-X}, corresponding to two filters. The first filter corresponding to three sequential matches (XXX), and the second filter corresponding to two sequential matches, followed by a mismatch, and a third match (XX-X). The extracted set $S_w$ includes the 15 words listed in table 300, of which the $12^{th}$ word is RC-D. Given a portion of a text: "GGGGGG-GRCGDGGGGGGGGG", this portion contains only one instance of the word RC-D, corresponding to the configuration XX-X, and does not contain the other words. Thus, the comparison with the word RC-D occurs in one position only, with the character "G" in the text aligning with the character "C" in the search word, resulting in one mismatch:

$$\begin{array}{c} \text{GGGGGGG}\underline{\text{RC}}\text{G}\underline{\text{D}}\text{GGGGGGGGG} \\ \cdots | \,|\cdot| \cdots \\ \text{AA}\underline{\text{RC}}\text{C}\underline{\text{D}}\text{DEE} \end{array}$$

According to another embodiment of the present invention, the set of filters may not be generated or calculated for each user but rather a set of filters may be calculated for a wide range of parameters and stored in an accessible public database.

Reference is now made to FIG. 4, which is an illustration of several exemplary minimal sets of filters obtained by embodiments of the present invention. The advantage of these minimal sets over the naïve algorithm is described below.

The size of word |W|=20, the similarity threshold T=60% (i.e. up to 8 mismatches are permitted). |S|=size of the minimal set of filters S, $n_C$=number of produced words from a term for search in all filters of S, M=number of matches in a filter. The advantage (A) in comparison to the naïve algorithm is calculated as $d^M/n_C$, where d=the size of the alphabet, d=20.

According to another embodiment of the disclosed technique, a heuristic approach is used to find a good set of filters. The heuristic approach is applied by forming a plurality of sets of filters, according to a predefined order and assigning a score to each set of filters. The score may be assigned to each set of filters based on (i) its size, i.e. amount of filters in the set; and/or (ii) effectiveness, i.e. amount of words generated from that set of filters. Generally, the length of the filter influences the number of words that are generated from it. That is, as the length of the filter increases, the number of words decreases, thereby increasing the speed of the search.

Figure 5A:
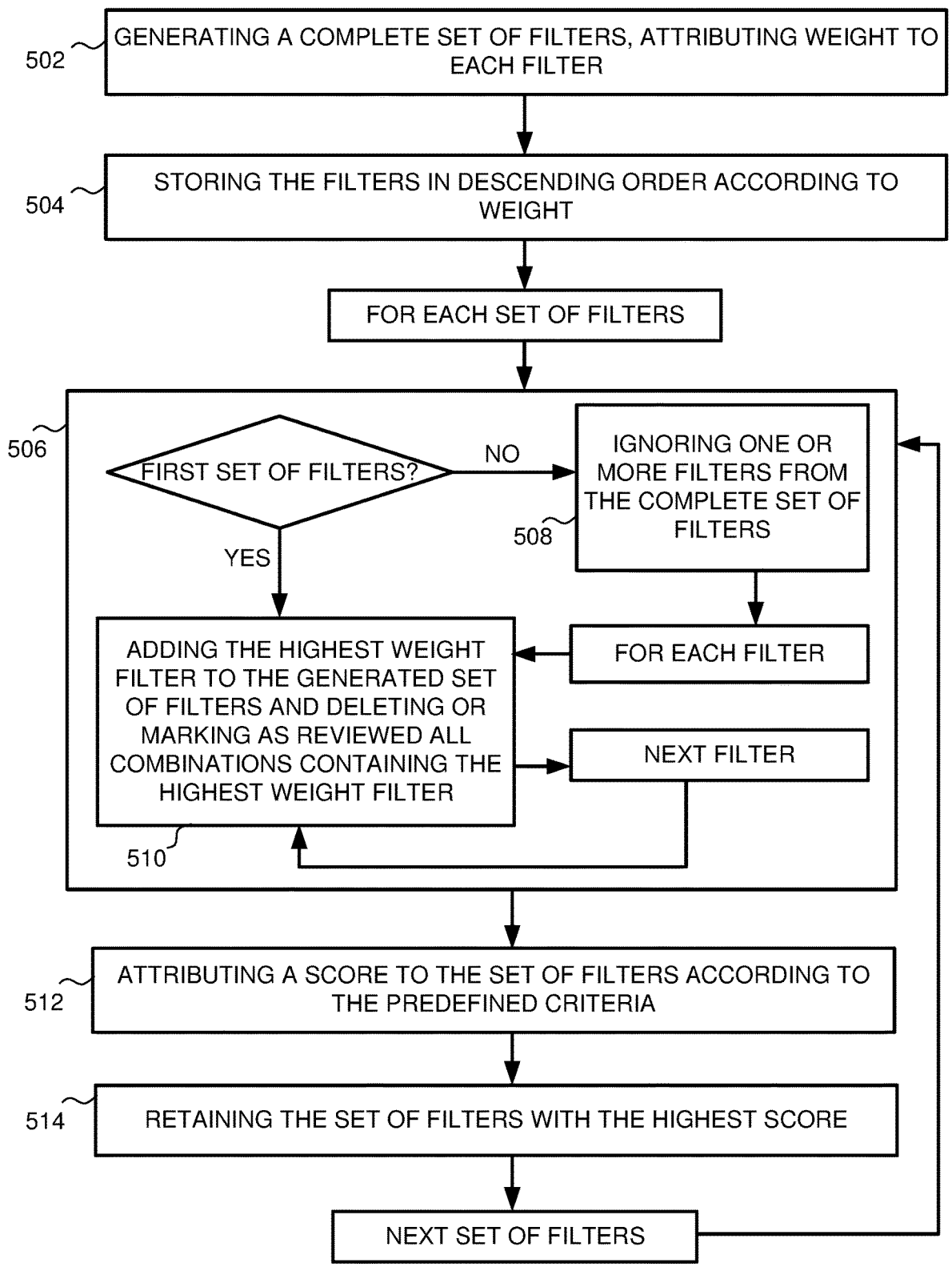
FIG. 5A is a flow chart explaining the steps of a method for a k-mismatch search system to create and select a set of filters from a plurality of generated sets of filters.

Referring to FIG. 5A, a good set of filters may be obtained by comparing the score assigned to each of the multiple sets of filters. Each set of filters may be formed after first performing the following two actions: i) generating a complete set of filters and attributing a weight, or score to each filter 502 and ii) sorting the filters according to the assigned score 504. The sorting may be in descending order.

Each set of filters 506 may be formed by the following steps: The set of filters is generated, and initiated. If it is not the first set of filters, one or more filters from the complete set of filters 508 are ignored. The filter with the highest score is added to the generated set of filters. Any combinations containing the filter with the highest score is marked as reviewed, and may be removed from the set of combinations to be examined. The above is repeated for unmarked combinations that have not been removed, until a satisfactory filter set has been built, or until the set of the combinations is empty or the set of combinations is exhausted (all marked as reviewed) 510. All non-retainable filters are removed from the set of filters, and a fitness score is assigned to the set of filters according to one or more predefined criteria 512. The set of filters with the best fitness score is retained 514. The best fitness score may be the highest score or the lowest score depending on the optimization criteria. The above steps for forming a set of filters may be repeated until the ignoring one or more filters of step 508 comprises deleting all the filters, excluding the filter with the highest score. Under some conditions, the cycle might not terminate due to the high number of possible combinations of filters that can be ignored. In such cases the steps may be repeated according to available computer power and time to obtain a satisfactory solution.

The predefined criteria for scoring each set of filters may be the number of filters in the set of filters and the number of words generated from the set of filters for a given search term.

The criterion for inclusion/preclusion of any of the one or more filters in 508 may be performed according to an element in a predefined series of arithmetic sequences. The predefined series of arithmetic sequences may be such that each element in the series is an arithmetic sequence with a common difference of d. In a non-limiting example, forming of the second set of filters may preclude the second highest filter in step 508, the forming of the third set of filters may preclude the second and third highest filters in step 508, the forming of the fourth set of filters may preclude the second, third and fourth highest filters in step 508 and so on. Therefore, according to this example d=1 and the elements in the series of arithmetic sequences are ({2}, {2,3}, {2,3,4} etc.).

Figure 5B:
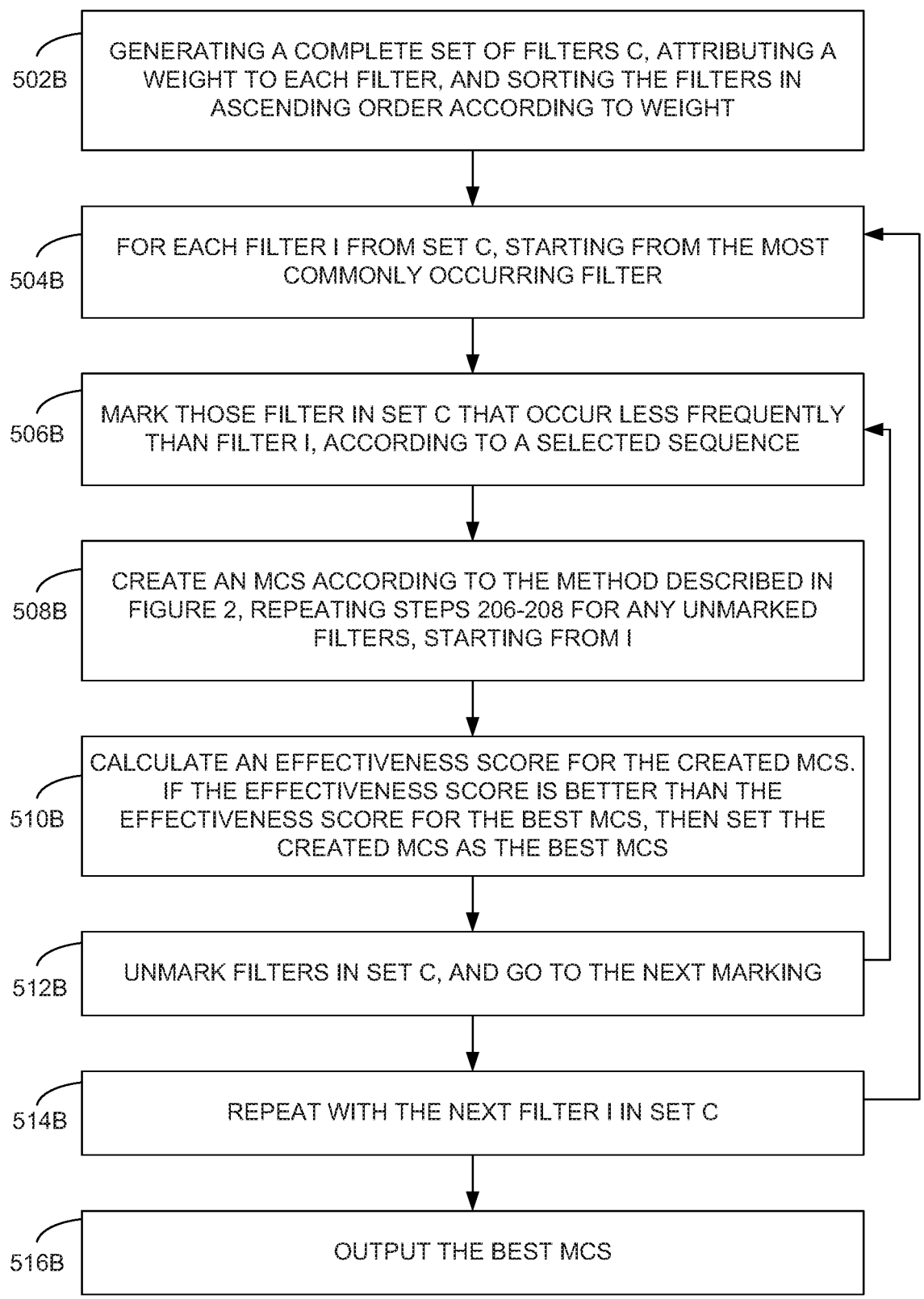
FIG. 5B is a flow chart explaining the steps of a method for a k-mismatch search system to create and select a set of filters from a plurality of generated sets of filters.

Reference is now made to FIG. 5B which illustrates a heuristic approach for finding a satisfactory set of filters, constructed and operative in accordance with another embodiment of the disclosed technique. The computer system performs the following steps:

A complete set of filters C is generated.
i. A weight (or score) is assigned to each filter; and
ii. the filters are sorted in descending order according to their respective weights (502*b*). For each filter i in C (starting from the most frequent i.e. highest weight) (504*b*)
   a. filters in C (which are less frequent than filter i) are marked according to a selected order, (detailed below) 506*b*.
   b. A minimal set of filters is created according to the method illustrated in FIG. 2, Steps 206-208 are repeated for unmarked filters, starting from i 508*b*.
   c. The effectiveness of the minimal set of filters is calculated.
   d. If the effectiveness is better than the effectiveness for the best minimal set of filters, the minimal set of filters is reserved as the best minimal set of filters 510*b*.
   e. The filters in C are unmarked, and the next marked filter is examined 512*b*.
   f. The above steps are repeated for the next filter i 514*b*. The output of these steps is the best minimal set of filters 516*b*.

Figure 6:
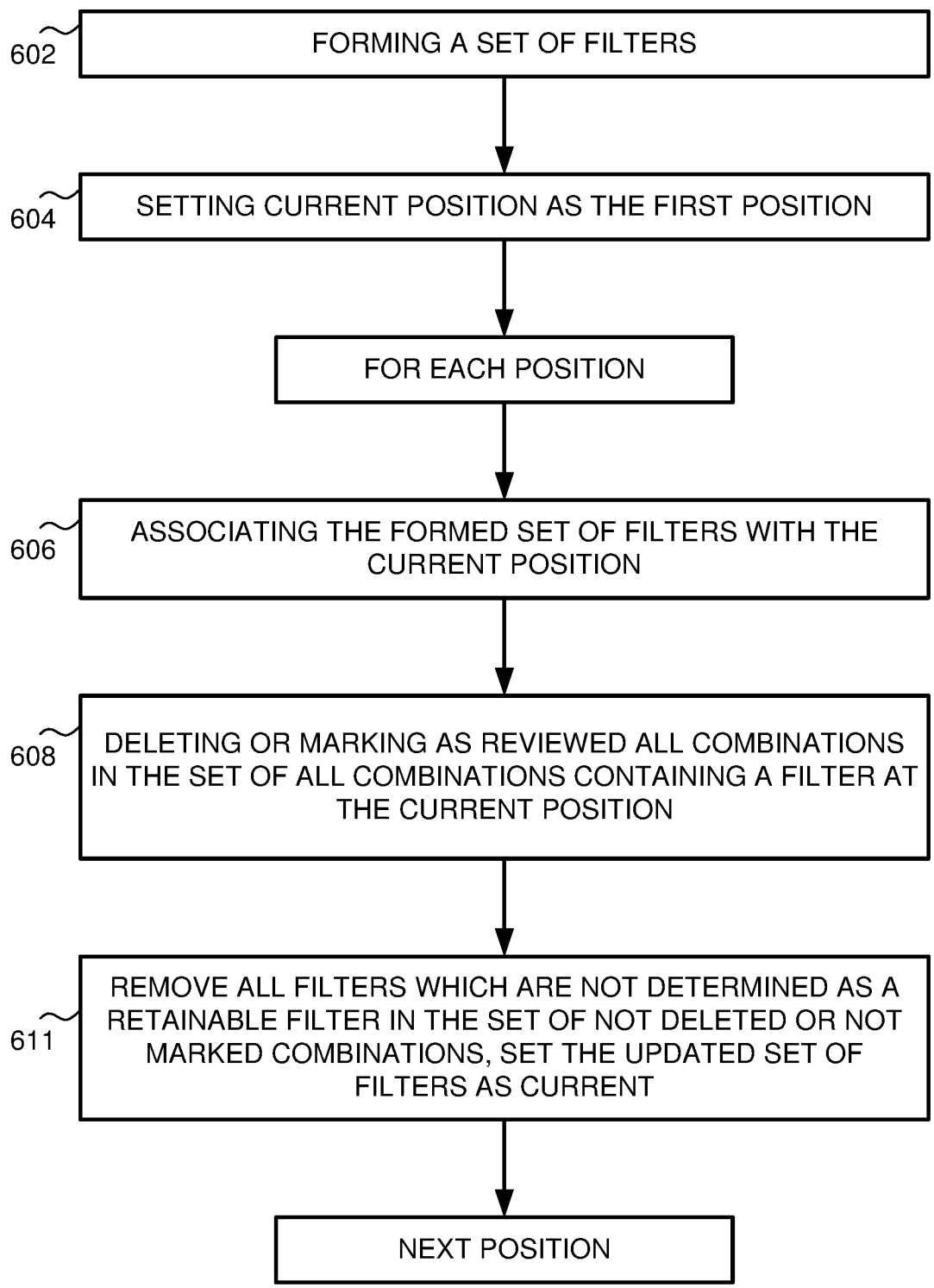
FIG. 6 is a flow chart explaining the steps of for a k-mismatch search system to generate a position-related set of filters.

Reference is now made to FIG. 6, which illustrates a heuristic approach for decreasing the number of generated words from a set of filters, constructed and operative in accordance with another embodiment of the disclosed technique. Decreasing the number of generated words from a set of filters may increase the speed of the search. The approach builds one or more filters for each position of the search word, taking into account the fact that there is a correlation of presence or absence of the filter in different positions in a word. Accordingly, position-related sets of filters are formed and each set of filters is associated to a particular position in a given search term. The filters may be of different sizes. One optimization disclosed is to only include filters that are actually found respective of a specific position in the search word.

The computer system performs the following steps: A set of filters (MCS) 602 is formed (by, for example, implementing one of the algorithms described hereinabove, to create a set of filters that covers all the possible combinations). The current position is set as the first position 604. The formed set of filters is associated with the current position 606. The first position may be the most left position of a given search term or may be 'low-occurrence' positions as detailed below. Alternatively, some sequence S of positions is selected in the searched term (the simplest sequence can be S={1, 2, ..., n−k+1} (k—the span of the smallest filter). According to the present invention, any other order may be used, and the first position in S is set as a current position 604.

All combinations in the set of all combinations containing a filter at the current position are removed, or marking as reviewed 608. The next position in S is set as the current position 610. The current position may be shifted by 1 to the right. The size of the set of filters is reduced to minimum i.e. to yield a minimal set of filters, after step 610 as described above. Any filter which is not determined as a retainable filter in the set of not removed, or not marked combinations is removed, or marking as reviewed, and the updated set filters is set as the current set of filters 611. The steps 606 through 611 may be repeated until the set of the combinations is exhausted. The obtained set of filters is the largest for the first position of the word, decreasing from the left position to the right in the sequence S.

The output of the method described in FIG. 6 is a set of sets. Each set of the set is associated with some position in the search term. One set (associated with the starting position) is largest (and the forms of this set should be used for mapping).

The effectiveness of the position related sets of filters may be calculated as the sum of comparisons of the filters associated with each position ($n_C$). The application of the position related set of filters may be performed by the following steps; mapping all words in all filters in the text; extracting for each position of term all words according to the correspondent associated with this position set of filters; comparing the terms with corresponding places in the text according to the mapping of the words extracted.

Table B below illustrates the results of scoring a set of filters. The scores are assigned according to the number of words generated from the set of filters for a given search term. Consider the first set in FIG. 4: S={XXX, XX-X}. The set was found for search term size |W|=20, and the similarity threshold T=60% (i.e. up to 8 mismatches are permitted). The number of words generated from the set of filters for a given search term is 35. Consider a search term: "abcdefghijklmnopqrst". The following Table shows that for the filter XXX, the words will be:

TABLE B

| abCdefghijklmnopqrSt | | abCdefghijklmnopqrSt | |
|---|---|---|---|
| 1 | abC | 1 | ab-d |
| 2 | bCd | 2 | bC-e |
| 3 | Cde | 3 | Cd-f |
| 4 | def | 4 | de-g |
| 5 | efg | 5 | ef-h |
| 6 | fgh | 6 | fg-i |
| 7 | ghi | 7 | gh-j |
| 8 | hij | 8 | hi-k |
| 9 | ijk | 9 | ij-l |
| 10 | jkl | 10 | jk-m |
| 11 | klm | 11 | kl-n |
| 12 | lmn | 12 | lm-o |
| 13 | mno | 13 | mn-p |
| 14 | nop | 14 | no-q |
| 15 | opq | 15 | op-r |
| 16 | pqr | 16 | pq-s |
| 17 | qrs | 17 | qr-t |
| 18 | rst | | |

The number of words $n_{C(i)}$ for each filter can be calculated as:

$$n_{C(i)} = |W| - |C(i)| + 1$$

where: $|W|$=size of the search term W, $|C(i)|$=span of filter i, including spaces.

Reference is now made to FIGS. 7A-7C which shows several position-related sets of filters, constructed and operative in accordance with another embodiment of the disclosed technique. The effectiveness of the algorithm may be significantly increased by using position related sets of filters suitable to a specified search term. This may account for occurrences of each extracted word in a formed position related set of filters in the text. Thus, the 'low-occurrence' positions of the specified search term may be associated with the largest sets, while the 'high-occurrence' positions may be associated with the smallest sets. The sets of filters were calculated for the search conditions described in FIG. 4 (search term size $|W|$=20, and the similarity threshold T=60% (i.e. up to 8 mismatches are permitted). The sequence of the positions is S={1, 2, 3, . . . }. The starting sets are sets given in the FIG. 4.

Referring to FIG. 7A, an example of the position-related set of filters is shown for the number of matches in the filter, M=3, corresponding to the top row of Table 400 in FIG. 4. This means one should make comparisons with the form "XXX" from the search word only up to the 13th position. Referring to FIG. 7B, an example of the position-related set of filters is shown for the number of matches in the filter, M=4, corresponding to the second top row of Table 400 in FIG. 4. Referring to Table C in FIG. 7C, the scores of the position-associated sets are compared with the score for the filter sets presented in FIG. 4, where the scores are determined according to the number of words generated from the set of filters for a given search term.

According to another exemplary embodiment of the present invention, an array of sets of sets may be prepared, as follows: for a given search word, starting from different positions, a lowest occurrence position is selected. The set of sets that start from this lowest occurrence position is used. Similarly, the array of set of sets can contain a set of sets having different assignments for the next positions in S. In the latter case a first and second lowest occurrence position may be selected, and the set of sets with corresponding first and second lowest occurrence positions are used. The procedure continues for larger numbers of positions.

The 'low-occurrence' position is calculated as the sum of occurrences of all words starting from this position for all filters from the set of filters associated with this position. The word occurrences may be provided from the mapping of all words for all filters from the set of filters in the text (text pre-proceeding).

Embodiments of the present invention may be adopted for several implementations: (i) searching of all similar words for one word or a set of words in a given text; (ii) searching of all similar words for one word or a set of words in an online stream; and (iii) searching for each word in a first text similar words in a second text; (iv) indexing, i.e. searching for each word of a text similar words in the same text (which may be considered as building of similarity graph of words of the given text).

Usage of full set of all filters for search is described in Frenkel, Z. M. and Trifonov, E. N. Evolutionary networks in the formatted protein sequence space. Journal of Computational Biology, 14(8):1044-57, October 2007. The full set of all filters is generated by exhaustive combinatorics.

An exemplary embodiment of the present invention provides a method for searching for the words that are similar to one word or a set of words in a given text, using the minimal set of filters described above, thereby providing an improvement over the exhaustive approach. Text indexing is similar to constructing a similarity graph for the text. The similarity graph is characterized by a plurality of nodes connected by a plurality of edges. The nodes represent a plurality of repetitions of character sequences, corresponding to the size of the search term; each edge connects a pair of nodes is based on the respective similarity threshold between the nodes. The similarity graph may be compressed according to conventional methods, such as the method described in [PCT/IL2016/051220]. The clustering of the words may significantly reduce the time needed to complete a search.

This may be explained as follows. Consider the following Lemma: If the following conditions are satisfied:
1. The words A, B, C, D are each of size m
2. The word A is similar to the word B, having a maximum number of mismatches x, i.e. the distanced between A and B is (d (A, B)≤x)
3. The word C is similar to the word D, having a maximum number of mismatches y i.e. the distance d between C and D is (d(C, D)≤y)
4. The word A is different from the word C, having a maximum number of matches z, i.e. at least m−z mismatches. Thus the distance d between A and C is (d (A, C)≥m−z)

Then, word B is similar to D within a maximum number of mismatches given by: max {0; m−(x+y+z)}, and the following relationship holds:

$$d(B,D) \leq \max\{0; m-(x+y+z)\}$$

The proof of this result is as follows. One can consider two circles, the first circle has radius x with A in the center and B on the edge. The second circle has radius y, with C in the center and D on the edge. The circles can overlap for the case of the minimal distance between A and C, or the circles can be spread apart for the case of the maximum distance between A and C The two possible cases are: 1) the minimal distance between B and D is given by: m−(x+y+z), and 2) the minimal distance between B and D is 0 (i.e. the circles overlap).

The above lemma may be applied to performing a search, as follows. In order to check if two clusters match within 60% similarity, (i.e. for a sequence of 20 characters, up to eight mismatches, or at least 12 matches), the clusters are built to comply with a similarity criterion. For example, one such criterion may be that all the sequences in each cluster are similar to the correspondent cluster-seeding sequence within at least a 90% similarity measure (i.e. maximum two mismatches).

If each of the seeding sequences have a maximum similarity of 35% (i.e. at most 7 matches) then the maximum similarity between any two sequences of the two clusters cannot exceed 11 matches (i.e. 55%). In other words, the minimal distance between the clusters is at least 9 mismatches (20−(7+2+2)=9). In such a case, a connection complying with a 60% similarity requirement between the two clusters is impossible. Thus, such pairs of clusters need not be checked, to optimize memory, time and computational resources. If the first cluster has m sequences and the second cluster has n sequences, the economy is m*n−1 comparisons. It may be noted, that the probability of finding a sequence fragment of 35% of similarity in the database is relatively low (about $10^{-5}$ for 20-letter alphabet).

The following indexing algorithm may be applied, for th1 representing a threshold for the minimal number of matches needed for indexing, and for th2 representing the maximal number of mismatches needed for clustering:
1) Divide the text into a set of clusters of words. The clusters are formed as follow:
    a) For each word that is not in cluster:
    b) find all similar words at the selected threshold th2, i.e. by using the k-mismatch search described above;
    c) Sort the words in the cluster: the words more similar to the seed word are assigned smaller indices;
2) Check that the connections between the clusters comply with the following condition(s): the cluster are connected if there is at least one word from the first cluster that is similar to at least one word from the second cluster with the similarity threshold, th1:
a) For the seed words (determined according to the k-mismatch search technique described above), find all the seed words similar to within at least (K1=th1−2*th2) matches. i.e. similar words can only appear in such clusters;
b) Compare only words of indices i and j of the clusters, where $K_1+K_i+K_j \geq th1$ (i.e. $K_1$ is the number of matches between the seed words, $K_i$ and $K_j$ are the number of mismatches of the words i and j, respectively, with the corresponding seed words).
c) if a connection is detected, the procedure terminates.
3) Complete the indexing. This step is optional since for many applications, identifying a connection between clusters is sufficient.
a) compare all the nodes within each cluster;
b) compare the words of connected clusters (similarly, only words of that indexes i and j of the clusters, where $K_1+K_i+K_j \geq th1$, where $K_1$, $K_i$, and $K_j$ are as above.

The text indexing algorithm is now given as follows: i) all the words present in all filters are mapped in the text. ii) for each search word, all the words in all filters are extracted, and the terms are compared with the search text according to the mapping of the extracted words. For fast access, addresses of the extracted words may be used.

According to another exemplary embodiment of the present invention, under certain conditions, the words in all filters in the search terms are mapped and stored in a suffix tree data structure for a set of search terms. The comparison with the whole set of filters is performed in linear time. Such conditions may include when the pre-processing of the text cannot be implemented. For example: when the text is unavailable, or the text streams on-line or the amount of available memory is not enough.

In one exemplary embodiment, 'low-occurrence' positions of the specified search term may be associated with largest sets, while the 'high-occurrence' positions may be associated with the smallest sets. Thus two position-associated sets of filters are calculated for two orders of positions S1 and S2.

Referring to Table C below, two position-associated sets of filters are shown for two possible sequences, of positions, S1, S2, in the search term, where XXX refers to three sequential matches, and XX-X refers to two sequential matches, follows by one wild card, and one match:

TABLE C

| $S_1 = \{1, 2, 3, 4, \ldots, 15, 16, 17, 18\}$ | | $S_2 = \{14, 15, 3, 4, \ldots, 12, 13, 1, 2, 16, 17, 18\}$ | |
|---|---|---|---|
| Position | Set | Position | Set |
| 1 | XXX, XX-X | 1 | XXX, XX-X |
| 2 | XXX, XX-X | 2 | XX-X |
| . . . | . . . | 3 | XXX, XX-X |
| 12 | XXX, XX-X | 4 | XXX, XX-X |
| 13 | XXX, XX-X | . . . | . . . |
| 14 | XX-X | 14 | XXX, XX-X |
| 15 | XX-X | 15 | XXX, XX-X |
| 16 | XX-X | 16 | XX-X |
| 17 | XX-X | 17 | XX-X |
| 18 | — | 18 | — |

Consider a word for search W='ABCDEFGHIJKLMNOPQRST'. Suppose occurrences of all three-letter words in the text are the same—equal to zero, excluding 'BCD' (i.e. XXX) and 'BC-E' (i.e. XX-X), which are equal to 1000 occurrences each. To find all words similar to the search word W in the text (with 60% similarity threshold), according to the left set of sets (calculated with S1), one would use the sequences 'BCD' and 'BC-E', which requires performing 2000 comparisons, whereas finding all the words similar to W with 60% similarity using the right set of sets (calculated with S2), where 'BC-E' is not used, will require performing 1000 comparisons. Thus the right set is more efficient for such a search word and such a text.

When the positional associated set of the sets of filters is prepared as described herein, the resulting positional associated set depends on the order or "sequence" of the positions in the search term, as illustrated above in Table C. Although the expected number of comparisons may be the same from using a different set of sets of filter, the number of filters corresponding to a specific position may be substantially different, affecting performance. After mapping the filters in a specific text for search, the occurrences of the search words, in the form of all the filters, is known, and can be used to further optimize the search. For example, occurrences of 'BCD', 'BC-E' in the text for search, as well as any other words from the search term in the example above are known. Thus, for a given search word, the corresponding set of sets that provide the minimal number of comparisons with the text may be selected to improve the speed of search. The sequence of positions that provides the set of sets having the minimal of comparisons with the search term is selected. However, the "general" set of filters, or initial set of filters for all the set of sets of filters is the same. This allows using the same mapping for all possible positional set of sets of filters.

According to yet another exemplary embodiment of the present invention, searching for a word or more may be performed by initially constructing a similarity graph of the given text. The similarity graph may be compressed according to a higher similarity threshold where the connection between the "super-nodes" indicates that there is at least one connection between the corresponding subgraphs in the primary graph. The minimal set of filters may be applied in the process of finding the connection between the super-nodes.

The following is an example of using a compressed similarity graph for indexing:

Task: for the text T build the similarity graph, i.e. find for each word all words similar at least with a threshold thr1.
  i. Create clusters (with selected maximal size) as subgraphs, where the condition for connection is a threshold thr2, which is higher than thr1. For example, is thr1 is 60% matches, thr2 can be 80-90% of matches. It can be demonstrated, that required much less set of filters, that is required much less time and RAM for calculation.
  ii. Calculate connections between the clusters (which is also much quicker than full network calculation. That means, if there are at least one pair of nodes, first from the one cluster and second from another cluster, which are connected (with thr1), the clusters called "connected".
  iii. Calculate the similarity graph on the basis of the calculated connected clusters. This task is also much quicker than the direct calculation (because the comparisons should be carried out only inside the clusters and between the connected clusters.

According to yet another exemplary embodiment of the present invention, the k-mismatch search may be lossy, in the sense that the matching word will be found in the text within a probability threshold. The algorithm described above is "lossless", i.e. it does not lose any words that are similar to the search word within a selected threshold if the considered set of the combinations contains all possible combinations of the positions of matches and gaps for given threshold and search term size. However, the disclosed technique may also be used as a "lossy" algorithm, i.e. to find the similar words within at least some predefined probability. One advantage of this approach is the increased speed of search and decreased RAM requirements for the pre-proceeding.

To adapt the technique for a "lossy" algorithm, a set of filters is constructed that cover only part of the full set, i.e. a subset, of the complete set of combinations of positions of matches and gaps. The proportion of the subset size to the full set should be greater than or equal to the predefined probability of finding the search word. In this case the algorithm is repeated until the subset of the full set of a complete set of combinations of positions of matches and gaps is be marked or removed, as opposed to performing this until the entire set of combinations is exhausted.

In some applications the search term may not limited by a selected size (with a corresponding number of permitted mismatches). Rather, the search term may have a permitted size (S) that may vary, for example between a predefined lower boundary ($S_L$) to some predefined upper boundary ($S_U$). The number of permitted mismatches may also vary between high and low mismatch thresholds. For example the number of permitted mismatches may be proportional to the size of the search term, the context of the application, characteristics of the text, to name but a few. In such cases it may be useful to create a "universal" set of filters that may be applied to a variety of different contexts within a range of search word size and/or number of mismatches.

Although for a permitted search term size S, a corresponding set of filters is required to provide the optimal speed of search, the mapping, which requires RAM resources, does not have to be repeated for each distinct size within the range of permissible sizes for S. An implementation for an algorithm to calculate such that a "universal" set of filters is given as follow:
  i. Construct the set of filters (by one of the above algorithm) for $S_L$;
  ii. Add this set to set of filters for mapping (SFM);
  iii. For each $S_i$ from $S_{L+1}$ to $S_u$ build the set of filters by, for example, algorithm described in Paragraph 1 in the claims, using the SFM as an initial set (i.e., instead of empty initial set used in the algorithm).
  iv. If new filters are added to the set, checking "if the filter is retainable" should be done starting from the new filters.
  v. Add new (retainable) filters to the SFM.

As result, a set of set of filters is constructed containing a set for each possible size of the search term (with corresponding similarity conditions). However, only filters from the SFM are present in these sets. Thus, only these filters should be mapped in the pre-proceeding.

For the cases when the size of the search term |W| is larger than $S_U$, the search term may be divided into two words of equal size $W_{left}$ and $W_{right}$, for each word all similar words (with the same similarity threshold (in %)) should be detected in the text. Upstream text of the words similar to $W_{right}$ should be compared with $W_{left}$, and downstream text of the words similar to $W_{left}$ should be compared with $W_{right}$.

The techniques described herein may be applied to any number of contexts. For example, when searching for words in a dictionary, often the search term must undergo a "normalization" stage, to account for discrepancies in spelling, tense, single/plural, etc. Thus the techniques disclosed herein may be used in place of such a normalization stage, or in conjunction with a normalization to provide better results.

The set of filters obtained as described above may be adapted for searching in a list of words (dictionary). In this case, a position of each word in each filter should be taken into account in the mapping. Only those words of the dictionary that contain a corresponding filter at the same position to the search term should be selected for comparison with the search term.

Additional techniques as are known in the art may be used in conjunction with the system and methods disclosed herein, to enhance performance. Under certain conditions the size of the alphabet affects the performance, or effectiveness of the algorithm. Smaller alphabets may reduce the combinatoric complexity of the search, thus in some contexts it may be possible to cluster two or more letters to one letter, to reduce the size of the alphabet, increasing the effectiveness of the algorithm. One possible substitution may be to cluster two or more letters from the initial alphabet to one letter of the new alphabet. Alternatively, in some cases, increasing the size of the alphabet may decrease the number of occurrences of each filter. For example, the text for DNA has a 4-letter alphabet {a, t, c, g}, corresponding to the four nucleotides present in DNA. The probability of occurrence of any three-letter words is thus $1/4*1/4*1/4=1/64$. A new alphabet of size 16 (=$4^2$) may be built from all the two-letter combinations as follows: {aa, at, ac, ag, ta, tt, tc, tg, . . . }. The probability of occurrence of any three-letter word will now be $1/16*1/16*1/16=1/4096$, i.e. considerably smaller. This may increase the efficiency of the search considerably. The alphabet size may be increased or decreased accordingly.

Additional implementations: a database for filters may be created for different applications. Genetic algorithms may be used to improve the quality (effectiveness) of the set of filters.

Figure 8A:
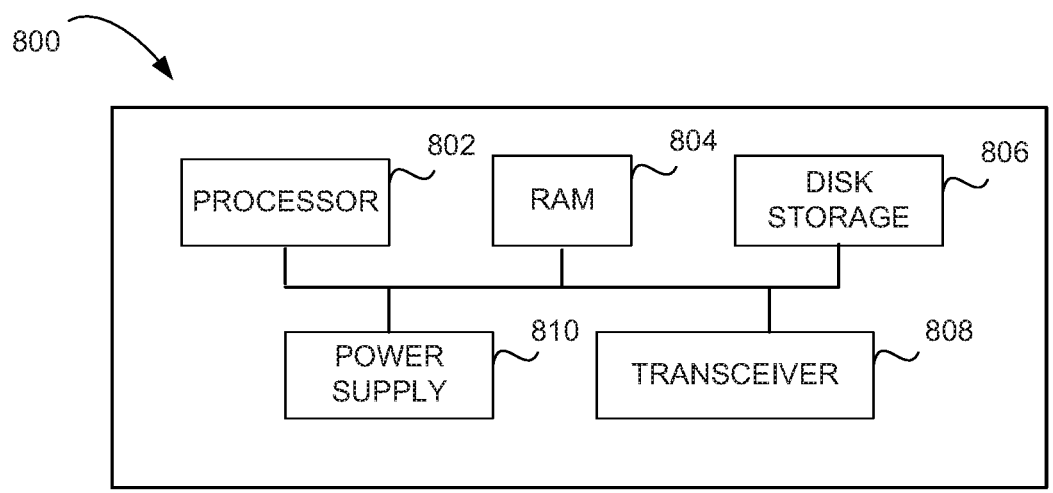
FIGS. 8A-8B each illustrate a computer system for executing any of the steps disclosed herein, constructed and operative in accordance with an embodiment of the disclosed technique.

Reference is now made to FIG. 8A which illustrates a computer system 800 for executing any of the steps disclosed herein, constructed and operative in accordance with an embodiment of the disclosed technique. Computer system 800 includes at least one processor 802 (e.g. a CPU), a random access memory (RAM) unit 804, a disk storage unit 806, a transceiver 808, and a power supply 810. At least one processor 802, RAM unit 804, disk storage unit 806 and transceiver 808 are electrically coupled to power supply 810. RAM unit 804, disk storage unit 806 and transceiver 808 are communicatively coupled to at least one processor 802. Transceiver 808 is operative to send and receive data, comprising at least one or more program code instructions, and data pertaining to the k-mismatch search technique disclosed herein. Transceiver 808 may communicate with additional computer systems (not shown) using any suitable wired or wireless protocol, such as via electrical or optical cable, short and medium range communications means (e.g. Bluetooth, Wifi, IR), as well as longer range (e.g. RF and cellular), to name a few.

RAM unit 804 and disk storage unit 806 are each operative to store one or more program code instructions and data pertaining to the k-mismatch search technique disclosed herein, such as any may be received via transceiver 808. At least one processor 802 is operative to read the one or more program code instructions and data pertaining to the k-mismatch search technique, and execute the program code instructions on the data, thereby execute any of the steps described herein. At least one processor 802 is operative to write the results of the execution to RAM unit 804 and to disk storage unit 806. At least one processor 802 is operative to request data and provide data from and to additional computer system (not shown) via transceiver 808. At least one processor 802 is operative to provide the results of the execution to a user, such as via a user interface (not shown).

Figure 8B:
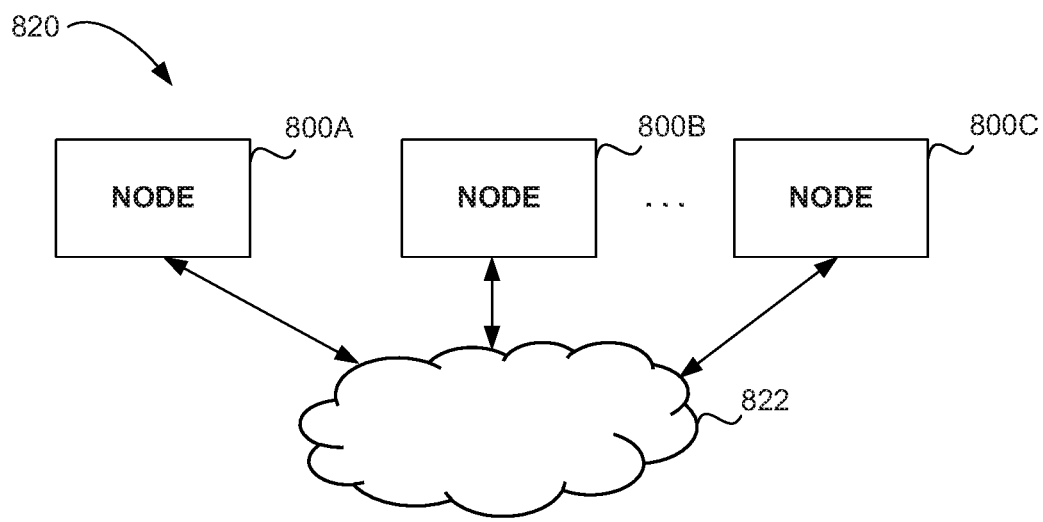

Reference is now made to FIG. 8B, while still referring to FIG. 8A, which illustrates a networked computer system 820 for executing any of the steps disclosed herein above, constructed and operative in accordance with another embodiment of the disclosed technique. Computer system 820 includes multiple nodes 800A, 800B, . . . 800N, and a communications network 822. Each of nodes 800A, 800B, . . . 800N correspond to computer system 800 of FIG. 8A. Thus, each of nodes 800A, 800B, . . . 800N include at least the components referred to above with respect to FIG. 8A, e.g. at least one processor 802 (e.g. a CPU), a random access memory (RAM) unit 804, a disk storage unit 806, a transceiver 808, and a power supply 810. Nodes 800A, 800B, . . . 800N are operative to communicate with each other via communications network 822 and respective transceivers 808 of each of nodes 800A, 800B, . . . 800N. Computer system 820 is operative to execute any of the steps describe herein in a distributed manner over nodes 800A, 800B, . . . 800N, using conventional techniques, as are known in the art of distributed computing. The steps may be performed in any combination of parallel and serial computing.

Computer system 800 and computer system 820 are each configured to perform at least the following steps:

A size of a search term and a similarity threshold are received. A set of filter is generated. A set of filters is formed based on a set of combinations of positions of matches and gaps for the size of the search term according to the similarity threshold. Each one of the combinations contains at least one filter from the set of filters. In some embodiments, each combination of the set of combinations includes a match at the first position of the respective combination. In some embodiments, each set of combinations additionally includes a match at the last position of the respective combination. With reference to FIG. 8A, processor 802 receives the search term and the similarity threshold, such as via transceiver 808. Processor 802 forms a set of filters based on a set of combinations of positions of matches and gaps for the size of the search term according to the similarity threshold. Each one of the combinations contains at least one filter from the set of filters.

For each filter of the set of filters, it is determined that the respective filter is a retainable filter when there exists at least one combination of the set of combinations, which contains only that filter. The filter is deleted from the set of filters when the filter is not a retainable filter. With reference to FIG. 8A, processor 802 determines that the filter is a retainable filter when at least one combination of the set of combinations contains only that filter. If processor 802 determines that a filter is not a retainable filter, processor 802 deletes the filter from the set of filters.

The filters are formed according to the following steps: The set of filters is initialized. For each selected combination of the set of combinations: an occurrence of a filter of the set of filters is searched for in the selected combination; a new filter is derived from the selected combination when the occurrence of a filter is not found in the selected combination. The new filter is added to the set of filters. In some embodiments, the new filter is a segment of the selected combination. In some embodiments, any of the new filter and a number of matches of the new filter is determined with a randomization process. In some embodiments, the number of matches is a predetermined quantity. In some embodiments, multiple new filters are derived from the selected combination and a score is assigned to each of the multiple new filters. The new filter is added to the set of filters when the score of the new filter is higher than the score of any other new filter of the multiple new filters. In some embodiments, the score may be assigned to each filter in accordance with any combination of the following parameters: an expected number of comparisons between the search term and a text respective of applying the filter; a frequency of occurrence of the filter in the set of combinations; a number of matches in the filter; and a span of the filter. With reference to FIG. 8A, processor 802 forms a set of filters as follows: processor 802 initializes the set of filters. For each selected combination of the set of combinations: processor 802 searches, in the selected combination, for an occurrence of a filter of the set of filters. If processor 802 does not find an occurrence of the filter in the selected combination, processor 802 derives a new filter from the selected combination, and adds the new filter to the set of filters.

A second set of filters may be created according to the following steps: one or more filters may be selected from the set of filters. Each of the selected filters may be replaced with at least one different filter, where the selection and replacements are performed according to a sequence sorted from the highest score of the selected filters to the lowest score of the selected filter, where each one of the combinations may contain at least one filter from the second set of filters. The second set of filters is selected over the set of filters in accordance with a fitness score. The fitness score may be calculated using one or more of the following parameters: an expected computation speed of search determined as a function of a sum of an expected number of comparisons for all the filters in the set of filters; and an amount of memory required to conduct a search respective of the set of filters. With reference to FIG. 8A, processor 802 creates the second set of filters according to the steps described hereinabove. Processor 802 selects the second set of filters of the original set of filters in accordance with a fitness score.

Multiple sets of filters may be generated as follows. Each position in the search term corresponds to at least one of the multiple sets of filters. Each one of the combinations contains, at a position in the respective combination, at least one filter from at least one of the multiple sets of filters. The position of the search term corresponding to the at least one of the multiple sets of filters corresponds to the position in the respective combination. With reference to FIG. 8A, processor 802 generates multiple sets of filters according to the steps described hereinabove.

Each of the multiple sets of filters is formed as follows: The set of combinations is designated as a current set of combination, and the set of filter based on the current set of combinations is set as the current set of filters. A sequence of positions in the search term is obtained. Following according to the sequence, for each position, a set of filters is generated in association with the position. A combination from the current set of combinations is updated if the combination contains a filter from the generated set of filters that is associated with the position. With reference to FIG. 8A, processor 802 creates multiple sets of filters. Each position in the search term corresponds to at least one of the sets of filters. Each combination contains at least one filter from one of the multiple sets of filters. The position in the combination where the filter is found corresponds to the position in the search term that corresponds to the set of filters containing that filter, i.e. the filter in the combination.

A filter is deleted from the current set of filters when the filter is not retainable with respect to the current set of combinations, where a filter is retainable with respect to the current set of combinations when there exists at least one combination of the current set of combinations which contains only that filter. With reference to FIG. 8A, processor 802 deletes a filter from the current set of filters when the filter is not retainable.

The set of filters associated with a position is formed as follows: The set of combinations is obtained, as well as the current set of filters and the position. For each filter of the current set of filters: the filter is added to the set of filters associated with the position when the filter is found in at least one of the combinations from the set of combinations, at the position, and, accordingly, the at least one combination is deleted, removed, or otherwise marked, from the set of combinations. With reference to FIG. 8A, processor 802 associates the set of filter with a position according to the steps described hereinabove.

In some embodiments, a plurality of sets of sets of filters is formed, where each one of the plurality of sets of sets of filters corresponds to a different sequence of a plurality of sequences of the positions in the search term. The set of sets of filters may be selected from the multiple sets of sets of filters according to an expected number of comparisons performed when the selected set of sets of filters is applied for executing the k-mismatch search. The expected number of comparisons is a function of a given text and given word for search.

In some embodiments, a lossy threshold is received. A subset of the combinations is created in accordance with the lossy threshold respective of the search term and the similarity threshold, where generating the set of filters comprises generating the filters respective of the subset of combinations. With reference to FIG. 8A, processor 802 receives the lossy threshold, such as via transceiver 808.

In some embodiments, the size of the search term corresponds to multiple possible sizes for the search term, and the similarity threshold corresponds to multiple similarity thresholds, each similarity threshold corresponding to a size from the multiple possible sizes for the search term.

In some embodiments, the execution of the k-mismatch search is applied for clustering a plurality of words of a text. The clustering may be applied to accelerate a text indexing step of the k-mismatch search.

The present invention is not limited to the embodiments described above, but encompasses any and all embodiments within the scope of the following claims. It will be appreciated by persons skilled in the art that the disclosed technique is not limited to what has been particularly shown and described hereinabove. Rather the scope of the disclosed technique is defined only by the claims, possible representative approximations of which follow:

What is claimed is:

1. A computer system for executing k-mismatch searches, comprising at least one processor, configured to:
   receive a size of a search term; receive a similarity threshold; and generate a set of filters by:
      forming the set of filters based on a set of combinations of positions of matches and gaps for the size of the search term according to the similarity threshold, wherein each one of the combinations contains at least one filter from the set of filters;
   wherein the at least one hardware processor is configured to form the set of filters by:
      initializing the set of filters;
      for each selected combination of the set of combinations:
         searching for an occurrence of a filter of the set of filters in the selected combination,
         deriving a new filter from the selected combination when the occurrence of a filter of the set of filters is not found in the selected combination, and
         adding the new filter to the set of filters;
   wherein the at least one hardware processor is configured to derive multiple new filters from the selected combination and assign a score to each of the multiple new filters, and add the new filter to the set of filters when the score of the new filter is higher than the score of any other new filter of the multiple new filters; and
   wherein the at least one hardware processor is further configured to assign the score to each filter of the set of filters in accordance with a parameter selected from the group consisting of:
      respective of applying the filter, an expected number of comparisons between the search term and a text;
      a frequency of occurrence of the filter in the set of combinations;
      a number of matches in the filter; and
      a span of the filter.

2. The computer system of claim 1, wherein said at least one hardware processor is further configured to create a minimal set of filters by:
   determining, for each filter of said set of filters, that said filter is a retainable filter when there exists at least one combination of said set of combinations which contains only said filter from said set of filters, and
   deleting said filter from said set of filters when said filter is not a retainable filter.

3. The computer system of claim 1, wherein each combination of said set of combinations includes a match at the first position of said respective combination.

4. The computer system of claim 3, wherein each combination of said set of combinations includes a match at the last position of said respective combination.

5. The computer system of claim 1, wherein said new filter is a segment of said selected combination.

6. The computer system of claim 1, wherein any of said new filter and a number of matches of said new filter is determined with a randomization process.

7. The computer system of claim 6, wherein said number of matches is a predetermined quantity.

8. The computer system of claim 1, wherein said at least one hardware processor is further configured to:
create a second set of filters by:
select filters from said set of filters,
replace each said selected filters with at least one different filter, said selecting and replacing performed according to a sequence sorted from the highest score of said scores of said selected filters to the lowest score of said scores of said selected filter, wherein each one of said combinations contains at least one filter from said second set of filters, and
select said second set of filters over said sets of filters in accordance with a fitness score.

9. The computer system of claim 8, wherein said fitness score is calculated using a parameter selected from the group consisting of: an expected computation speed of search determined as a function of a sum of an expected number of comparisons for all said filters in said set of filters; an amount of memory required to conduct a search respective of said set of filters.

10. The computer system of claim 1, wherein said at least one hardware processor is further configured to generate multiple ones of said set of filters, wherein:
each position in said search term corresponds to at least one of said multiple ones of said set of filters, each one of said combinations contains, at a position in said respective one combination, at least one filter from at least one of said multiple ones of said set of filters, said position of said search term corresponding to said at least one of said multiple ones of said set of filters corresponding to said position in said respective one combination.

11. The computer system of claim 10, wherein said at least one hardware processor is configured to form each of said multiple ones of said set of filters by:
designating said set of combinations as a current set of combination, and designating said set of filter based on said current set of combinations as a current set of filters, obtaining a sequence of positions in said search term,
for each said position, in accordance with said sequence, generate a set of filters in association with said position, update a combination from said current set of combinations when said combination contains at said position a filter from said generated set of filters associated with said position,
delete a filter from said current set of filters when said filter is not retainable with respect to said current set of combinations,
wherein said filter is retainable with respect to said current set of combinations when there exists at least one combination of said current set of combinations which contains only said filter.

12. The computer system of claim 11, wherein said at least one hardware processor is configured to form said set of filters associated with a position by:
obtaining said set of combinations, said current set of filters and said position; for each filter of the said current set of filters:
add a filter to said set of filters associated with said position when said filter is found in at least one of said combinations from said set of combinations at said position, and
delete said at least one of said combinations from said set of combinations.

13. The computer system of claim 1, wherein said at least one hardware processor is further configured to: receive a lossy threshold, create a subset of said combinations in accordance with said lossy threshold respective of said search term and said similarity threshold, wherein generating said set of filters comprises generating said filters respective of said subset of said combinations.

14. The computer system of claim 1, wherein said size of said search term corresponds to multiple possible sizes for said search term, and wherein said similarity threshold corresponds to multiple similarity thresholds, each similarity threshold corresponding to a size from said multiple possible sizes for said search term.

15. The computer system of claim 12, wherein said at least one hardware processor is further configured to form a plurality of sets of sets of filters, wherein each one of said plurality of sets of sets of filters corresponds to a different sequence of a plurality of sequences of said positions in said search term.

16. The computer system of claim 15, wherein said at least one hardware processor is further configured to select a set of sets of filters from said plurality of sets of sets of filters according to an expected number of comparisons performed when said selected set of sets of filters is applied for executing said k-mismatch search, wherein said expected number of comparisons is a function of a given text and a given word for search.

17. The computer system of claim 1, wherein said at least one hardware processor is further configured to apply said executing of said k-mismatch search for clustering a plurality of words of a text.

18. The computer system of claim 17, wherein said at least one hardware processor is further configured to apply said clustering to accelerate a text indexing step of said k-mismatch search.

* * * * *